(12) United States Patent
Kwak

(10) Patent No.: US 9,588,602 B2
(45) Date of Patent: Mar. 7, 2017

(54) LIQUID CRYSTAL DISPLAY DEVICE AND ELECTRONIC PEN SYSTEM USING SAME

(71) Applicant: PEN Generations Inc., Seongnam-si (KR)

(72) Inventor: Hee Hwan Kwak, Seongnam-si (KR)

(73) Assignee: PEN Generations Inc., Seongnam-si (KR)

( * ) Notice: Subject to any disclaimer, the term of this patent is extended or adjusted under 35 U.S.C. 154(b) by 0 days.

(21) Appl. No.: 14/443,397

(22) PCT Filed: Nov. 14, 2013

(86) PCT No.: PCT/KR2013/010318
§ 371 (c)(1),
(2) Date: May 18, 2015

(87) PCT Pub. No.: WO2014/077593
PCT Pub. Date: May 22, 2014

(65) Prior Publication Data
US 2015/0293614 A1    Oct. 15, 2015

(30) Foreign Application Priority Data
Nov. 16, 2012  (KR) .................. 10-2012-0130393

(51) Int. Cl.
| | |
|---|---|
| *G06F 3/0354* | (2013.01) |
| *G02F 1/1335* | (2006.01) |
| *G02F 1/01* | (2006.01) |
| *G02F 1/1333* | (2006.01) |
| *G02F 1/137* | (2006.01) |
| *G06F 3/03* | (2006.01) |

(52) U.S. Cl.
CPC ........ *G06F 3/03545* (2013.01); *G02F 1/0131* (2013.01); *G02F 1/13338* (2013.01); *G02F 1/13718* (2013.01); *G02F 1/133553* (2013.01); *G06F 3/0321* (2013.01); *G02F 2001/133374* (2013.01); *G02F 2201/08* (2013.01); *G02F 2203/11* (2013.01)

(58) Field of Classification Search
CPC .......... G06F 3/03545; G06F 1/133553; G06F 1/0131; G06F 1/13718; G06F 3/0321
See application file for complete search history.

(56) References Cited

U.S. PATENT DOCUMENTS 8,023,079 B2    9/2011  Chen et al.

FOREIGN PATENT DOCUMENTS

| | | |
|---|---|---|
| JP | 2005-235174 | 9/2005 |
| JP | 2010-102079 | 5/2010 |
| KR | 10-2004-0085182 | 10/2004 |
| WO | WO 2014/077593 | 5/2014 |

OTHER PUBLICATIONS

International Search Report Dated Feb. 17, 2014 From the Korean Intellectual Property Office Re. Application No. PCT/KR2013/010318 and Its Translation Into English.

*Primary Examiner* — Joseph L Williams

(57) ABSTRACT

Disclosed herein are a liquid crystal display device and an electronic pen system using the same. The liquid crystal display device includes an infrared reflection layer configured to reflect infrared irradiated thereto, the infrared reflection layer including an information pattern having virtual grid lines and a plurality of marks; and a liquid crystal layer formed on the infrared reflection layer and configured to be changed an orientation of liquid crystal molecules by an external pressure.

9 Claims, 3 Drawing Sheets

LIQUID CRYSTAL DISPLAY DEVICE AND ELECTRONIC PEN SYSTEM USING SAME

RELATED APPLICATIONS

This application is a National Phase of PCT Patent Application No. PCT/KR2013/010318 having International filing date of Nov. 14, 2013, which claims the benefit of priority of Korean Patent Application No. 10-2012-0130393 filed on Nov. 16, 2012. The contents of the above applications are all incorporated by reference as if fully set forth herein in their entirety.

BACKGROUND

Field of the Invention

Embodiments of the present invention relate to a liquid crystal display device and an electronic pen system using the same.

Discussion of Related Art

Electronic pen systems are pens of a new concept that combines analog and digital, are just like a normal pen writing a character on a piece of paper, and written content is stored in a memory included in the pen, and the written content is sent back in the form of an image file to a computer to manage the transmitted content. Although the document written by the normal pen is scanned by a scanner (electronic color disassembler) to be stored in the form of an image file, the document written by the electronic pen system does not require the scanning process, and there is an advantage of being easily manageable through a separate program. Initially developed electronic pen systems should be connected to a computer. That is, in order to use the electronic pen systems, the computer always had to be turned on and there was the inconvenience of always having to be used near the computer. Also, when the content is stored in the computer, resolution of the image file is low, and it is difficult to exactly understand the content.

Currently, high performance electronic pens, which are capable of transforming written content into digital data, whenever connected to a computer, by storing the written content in a memory included in the electronic pens, are released. Furthermore, since a liquid crystal display is included in the electronic pen system itself, a product which can be directly written on the screen to check the content, and a digital pen, which can wirelessly transfer data without connection with a cable, have been developed, and a touch screen type which can detect position information of the electronic pen on the display or a technology having a detection sensor outside thereof to detect a movement path of the electronic pen, and/or the like is utilized.

In the touch screen type, or the technology using the outside detection sensor, as a size of the display is increased, a cost of the display is increased, and power consumption is greatly increased, and an accuracy of sensing the moving path of the electronic pen is decreased. Thus, a technology which minutely forms an information pattern including position information of a surface on a surface of the display to a degree beyond a determination by the human eye, and detects the information pattern using the electronic pen having the optical sensor to determine the position on the display is commercially available.

In the technology of detecting the information pattern using the above-mentioned electronic pen, in order to detect the information pattern by the electronic pen, the information pattern is formed to be optically distinguishable from a material layer on which the information pattern is formed. That is, an infrared light source is reflected from the display or a paper to be distinguishable from the information pattern, but the infrared light may not be reflected from some display devices. In this case, the information pattern is not distinguishable from the display device, and thus, the electronic pen recognizes an incorrect information pattern, and the movement path of the electronic pen is distorted.

SUMMARY OF THE INVENTION

The present invention is directed to a liquid crystal display device capable of providing an information pattern which is detectable by an electronic pen system on the liquid crystal display device configured to display graphic information to the outside by an external pressure, and an electronic pen system using the same.

According to an aspect of the present invention, there is provided a liquid crystal display device including an infrared reflection layer configured to reflect infrared irradiated thereto, the infrared reflection layer including an information pattern having virtual grid lines and a plurality of marks; and a liquid crystal layer formed on the infrared reflection layer and configured to be changed an orientation of liquid crystal molecules by an external pressure.

The liquid crystal layer may be formed of a cholesteric liquid crystal.

The infrared reflection layer may absorb visible light and selectively reflect infrared.

The infrared reflection layer may include an infrared reflection film and an infrared diffusion film.

The mark may be formed using an infrared absorption ink.

The liquid crystal display device may further include an infrared light source; and a light guide configured to guide infrared emitted from the infrared light source toward the infrared reflection layer.

According to another aspect of the present invention, there is provided an electronic pen system including a liquid crystal display device having an infrared reflection layer configured to reflect infrared irradiated on a surface thereof, the infrared reflection layer including an information pattern having virtual grid lines and a plurality of marks, and a liquid crystal layer formed on the infrared reflection layer and configured to be changed an orientation of liquid crystal molecules by an external pressure; and an electronic pen configured to recognize graphic information displayed on the liquid crystal display device using the information pattern.

The electronic pen may include an infrared detection sensor, and sense infrared reflected from the infrared reflection layer to recognize the information pattern.

The electronic pen may further include an infrared light source.

The electronic pen may further include a communication part configured to transmit the graphic information, by wires or wirelessly.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
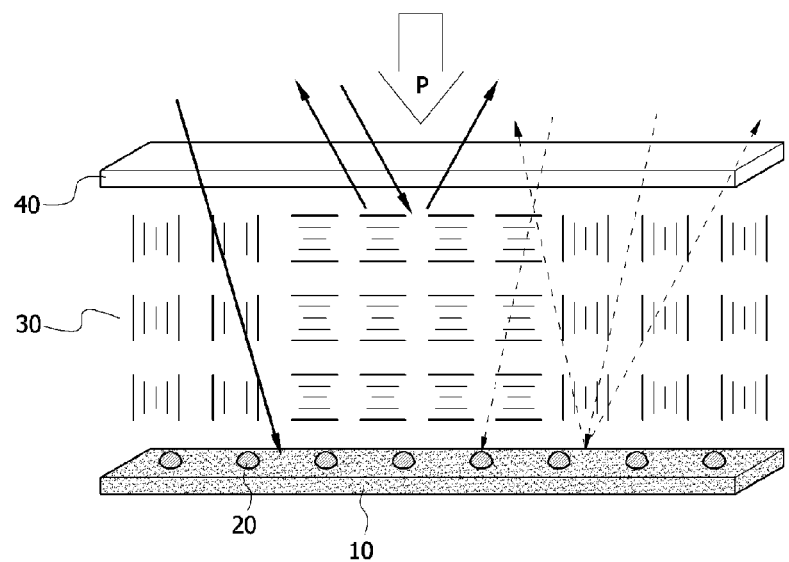
FIG. 1 is a configuration view illustrating a liquid crystal display device according to an embodiment of the present invention.

The present invention can be applied in various embodiments and various modifications, and in the specific embodiments illustrated and described in the drawings. However, this is not intended to limit the present invention to the specific embodiments, and it is to be understood as including all modifications, equivalents and substitutes included in the spirit and scope of the present invention.

Ordinal terms such as "first," "second," etc., may be used to describe various components, but the components are not limited to the above terms. These terms are only used to distinguish one element from the other. For example, without departing from the scope of the present invention, a second element could be termed a first element, and similarly, the first component can also be termed a second element. The term "and/or" includes any item of the plurality of listed items or combinations of the plurality of listed items.

When an element is referred to as being "connected to" or "coupled to," another element, the element may be directly connected or directly coupled to another element or intervening elements may be present. On the other hand, when an element is referred to as being "directly connected to" or "directly coupled to," another element, it is to be understood that intervening elements are not present.

The terminology used herein is for the purpose of describing particular embodiments only, and is not intended to limit the present invention. Representation in the singular, unless otherwise indicated in the text, includes a plural meaning. In this application, "comprise" or "have" is intended to indicate the presence of stated steps, operations, elements, parts or combinations thereof, but does not preclude the addition of the one or more other steps, operations, elements.

Unless defined otherwise, all terminology including technical or scientific terms used herein have the same meaning as commonly understood by those of ordinary skill in the art. General terms that are defined in a dictionary shall be construed to have the same meaning as in the context of the relevant art, unless otherwise defined explicitly in this application, and are not be interpreted in an idealized or excessively formal sense.

Hereinafter, the embodiments of the present invention will be described with reference to the accompanying drawings in detail, components, regardless of the corresponding component, will be assigned the same reference numerals throughout the drawings and thus duplicate description will be omitted.

FIG. 1 is a configuration view illustrating a liquid crystal display device according to an embodiment of the present invention.

Referring to FIG. 1, the liquid crystal display device according to the embodiment of the present invention may include an infrared reflection layer 10 reflecting infrared light incident onto a surface thereof, the infrared reflection layer 10 including an information pattern 20 having virtual grid lines and a plurality of marks, and a liquid crystal layer 30 formed on an upper layer of the infrared reflection layer 10 and being changed the orientation of liquid crystal molecules by an external pressure.

First, since the orientation of the liquid crystal layer 30 is changed by the external pressure, light of a specific wavelength may be selectively transmitted therethrough. The liquid crystal layer 30, for example, may be formed of a cholesteric liquid crystal having a bistable state of a color reflective state and a transparent state. The cholesteric liquid crystal has two stable states including the color reflective state which reflects the specific light and a transparent state which transmits light, and has the bistable state which maintains a state of the liquid crystal molecules by a polymer mixed in the liquid crystal molecules without a power supply after being electrically operated. The cholesteric liquid crystal has a helically shaped molecular structure, and reflects a light of a wavelength corresponding to a helical pitch in the color reflective state. Thus, a cholesteric liquid crystal having a helical pitch corresponding to a wavelength of a color to be reflected is used as the liquid crystal layer 30 of the embodiment of the present invention to display a desired color.

Figure 2A:
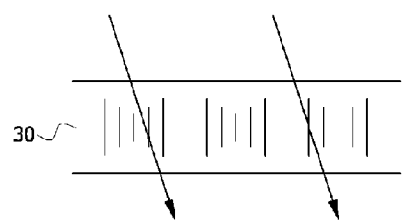
FIGS. 2(A) and 2(B) are state views illustrating a cholesteric liquid crystal according to the embodiment of the present invention.
Figure 2B:
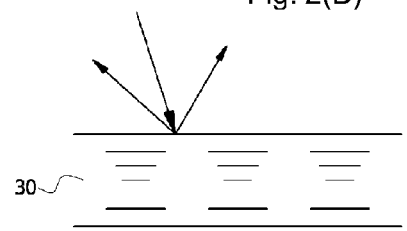

FIGS. 2(A) and 2(B) are state views illustrating a cholesteric liquid crystal according to the embodiment of the present invention. FIG. 2(A) represents the transparent state in which liquid crystal molecules in the liquid crystal layer 30 are lying in a helical shape without the external pressure, and external light may pass through the liquid crystal layer 30. Thus, when the liquid crystal layer 30 is in the transparent state, the external light passes through the liquid crystal layer 30 to display the color of the infrared reflective layer 10 disposed thereunder. FIG. 2(B) represents the color reflective state in which only specific light is reflected, by changing the orientation of the liquid crystal layers by the external pressure, and/or the like. In the color reflective state, the color of the infrared reflection layer 10 is not displayed to the outside, and a displayed color is determined by the wavelength of the light reflected from the infrared reflection layer 10.

Since the liquid crystal layer 30 displays the color of the infrared reflective layer 10 to the outside and changes a certain point into the color reflective state by the external pressure, and/or the like, by using the above-mentioned state change, graphic information such as a character, an image, and/or the like may be displayed to the outside. Since the liquid crystal layer 30 may maintain the bistable state, the changed state is maintained, and displayed graphic information is maintained unless additional external power is supplied.

The infrared reflection layer 10 may be disposed under the liquid crystal layer 30, and formed of a material which reflects the infrared. The infrared may be divided into a near infrared, a middle infrared, and a far infrared having a wavelength range of about 700 to 10,000 nm, and the infrared reflection layer 10 may reflect a light having a near infrared range of about 750 to 1,300 nm.

The infrared reflection layer 10 may be formed of a material which only selectively reflects light of the infrared range. The infrared reflection layer 10, for example, may be formed of a material which absorbs or transmits a visible light irradiated thereto and having passed through the liquid crystal layer 30 but reflects only the infrared range. The infrared reflection layer 10, for example, may include an infrared reflection film and an infrared diffusion film, and may be formed of a multi-layered structure formed by a combination of a plurality of infrared reflection films and infrared diffusion films.

Figure 3:
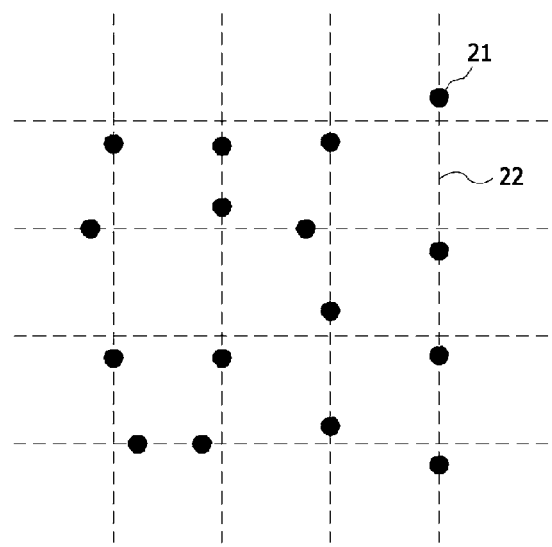
FIG. 3 is a descriptive view illustrating an information pattern according to the embodiment of the present invention.

The information pattern 20 configured to provide position information on the liquid crystal display device is formed on a surface of the infrared reflection layer 10. FIG. 3 is a descriptive view illustrating an information pattern 20 according to the embodiment of the present invention. Referring to FIG. 3, the information pattern 20 includes virtual grid lines 22 and a plurality of marks 21, and each of the marks 21 may be formed at a constant interval with respect to an intersection of the virtual grid lines 22. Each of the marks 21 may provide position information by a value of the mark 21 which is determined by a position at which the mark 21 is formed with respect to an intersection of the virtual grid lines 22.

The marks 21 may be formed at constant intervals with respect to an intersection of the virtual grid lines 22, and each mark 21 has a value, and the values of the marks 21 may be made by a combination of at least two different numbers. The mark 21 may have various shapes such as a circular shape, an elliptical shape, a polygonal shape, a linear shape, and/or the like, and preferably, one optical film may use marks 21 of the same shape.

Figure 4:
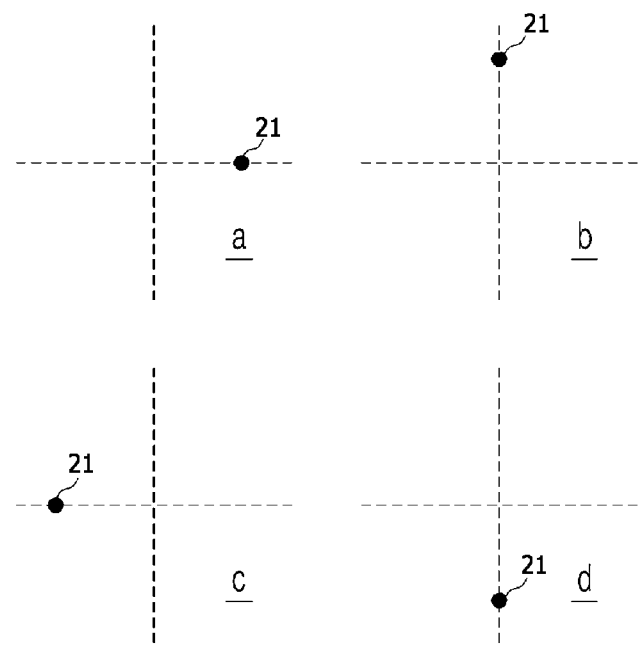
FIG. 4 is a conceptual view illustrating the information pattern according to the embodiment of the present invention.

FIG. 4 is a conceptual view illustrating the information pattern 20 according to the embodiment of the present invention. Referring to FIG. 4, the marks 21 may be disposed at four types of positions with respect to an intersection of the virtual grid lines 22, for example, when the mark 21 is disposed at a right side of an intersection as illustrated in 'a', the value of the mark 21 is "1", and when the mark 21 is disposed above an intersection as illustrated in 'b', the value of the mark 21 is "2", and when the mark 21 is disposed at a left side of an intersection as illustrated in 'c', the value of the mark 21 is "3", and when the mark 21 is disposed below an intersection as illustrated in 'd', the value of the mark 21 is "4", and thus, the position information may be provided based on the position of the mark 21 with respect to an intersection of the virtual grid lines 22.

Also, the mark 21 may be formed in a diagonal direction instead of the virtual grid lines 22, and a plurality of marks 21 may be formed at one intersection of the virtual grid lines 22. In this case, the value of each mark 21 may be described in arbitrary x,y coordinates, and the position information may be provided from the values of the marks 21 described as the x,y coordinates.

The virtual grid lines 22 may be formed vertically and horizontally at constant intervals. A distance between the virtual grid lines 22 may be in a range of 250 to 300 μm, and the mark 21 may be formed at a position spaced apart from an intersection of the virtual grid lines 22 by a distance of ¼ or ⅛. Further, the mark 21 may be formed in association with two or more marks 21 with respect to an intersection of the virtual grid lines 22.

When an infrared detection sensor 110, for example, detects thirty six marks 21 of each of six virtual grid lines 22 in the vertical and horizontal directions, which is a 6×6 size, the position information related to the value of each mark 21 may be calculated and an absolute position on the liquid crystal display device may be determined using the above.

The mark 21 includes an ink material which has excellent transmittance of visible light and selectively absorbs infrared light. The mark 21 may absorb a near infrared range of about 750 to 1,300 nm.

The mark 21, for example, may be formed of a resin compound material mixed with a phthalocyanine based compound, a naphthalocyanine based compound, aminium based compound, and/or the like, which have infrared absorptive characteristics, and an infrared curable resin, and a curing agent.

A film layer 40 formed of a transparent material, through which light is transmitted through the film layer 40 to be incident onto the liquid crystal layer 30 and the infrared reflection layer 10, may be formed on a surface of the liquid crystal display device. The film layer 40 may include a plastic film, which is made of polyethylene terephthalate (PET), polyethylene naphthalate (PEN), aligned polypropylene, polycarbonate, triacetate, and/or the like, glass, and/or the like.

Figure 5:
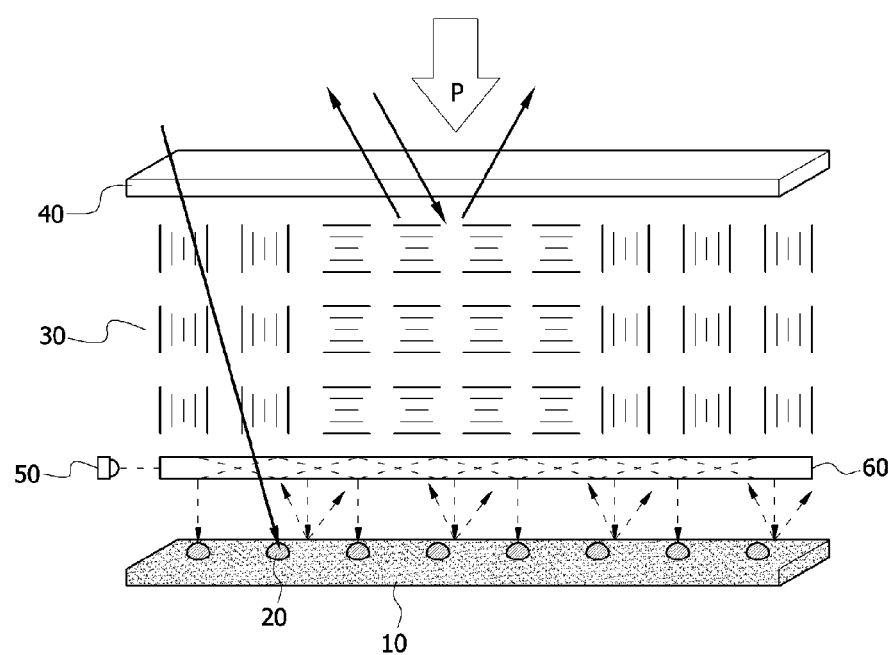
FIG. 5 is a configuration view illustrating a liquid crystal display device according to another embodiment of the present invention.

FIG. 5 is a configuration view illustrating a liquid crystal display device according to another embodiment of the present invention.

The liquid crystal display device according to the embodiment of the present invention may include an infrared reflection layer 10 reflecting infrared irradiated onto a surface thereof, the infrared reflection layer 10 including an information pattern 20 having virtual grid lines and a plurality of marks, a liquid crystal layer 30 formed on an upper surface of the infrared reflection layer 10 and being changed the orientation of liquid crystal molecules by an external pressure, an infrared light source 50, and a light guide 60 configured to guide infrared emitted from the infrared light source 50 toward the infrared reflection layer 10.

The infrared light source 50 emits the infrared, and thus, an infrared sensor recognizes position information from an information pattern 20 formed on the infrared reflection layer 10. The light guide 60 performs a function of providing a movement path of light, and thus, the infrared emitted from the infrared light source 50 is incident onto the infrared reflection layer 10 and the information pattern 20.

In FIG. 5, the infrared light source 50 and the light guide 60 are interposed between the liquid crystal layer 30 and the infrared reflection layer 10, but the infrared light source 50 and the light guide 60 may be interposed between the film layer 40 and the liquid crystal layer 30, and may be considerable to be disposed on the film layer 40.

Figure 6:
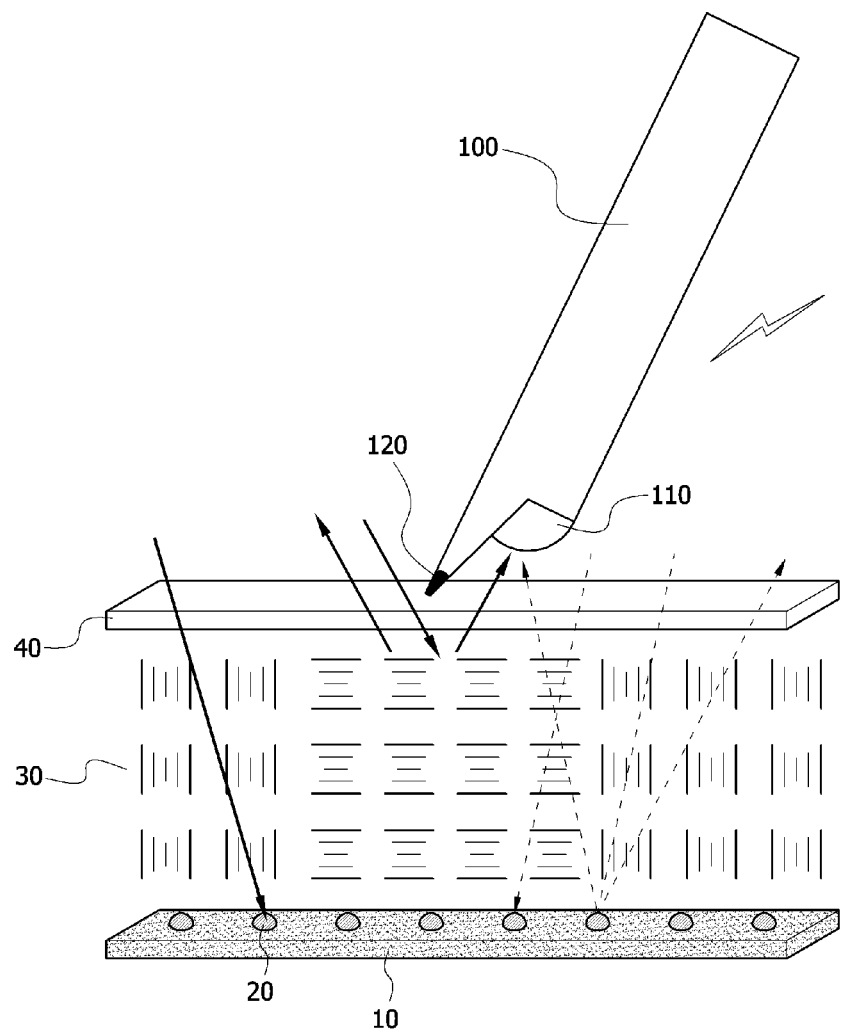
FIG. 6 is a configuration view illustrating an electronic pen system according to an embodiment of the present invention.

FIG. 6 is a configuration view illustrating an electronic pen 100 system according to an embodiment of the present invention. The electronic pen 100 system according to the embodiment of the present invention includes a liquid crystal display device including an infrared reflection layer 10 reflecting infrared irradiated onto a surface thereof, the infrared reflection layer 10 including an information pattern 20 having virtual grid lines 22 and a plurality of marks 21, and a liquid crystal layer 30 formed on the infrared reflection layer 10 in which the orientation of liquid crystal molecules is changed by an external pressure, and an electronic pen 100 configured to recognize graphic information displayed on the liquid crystal display device.

The electronic pen 100 may be a general pen type, and an infrared detection sensor 110 may be provided at a portion at which a tip of the pen is formed. The infrared detection sensor 110 may sense infrared reflected from the mark 21 formed on the infrared reflection layer 10 to recognize the information pattern 20.

The electronic pen 100 may calculate a value of the mark 21 based on the information pattern 20 recognized by the infrared detection sensor 110 and calculate a position in the liquid crystal display device. When the infrared detection sensor 110, for example, detects thirty six marks 21 of each of six virtual grid lines 22 in the vertical and horizontal directions, which is a 6×6 size, the position information related to the value of each mark 21 is calculated and an absolute position on the liquid crystal display device may be determined using the above.

The electronic pen 100 may transmit the calculated position information to the liquid crystal display device, an external computer, a notebook, a smartphone, and/or the like through a communication part (not shown), by a wired or wireless communication method. The external device receiving the graphic information may display the graphic information to the outside according to a path of the position information transmitted from the communication part. The communication part and the external device may use a wired connection to transmit the data through a serial transmission method, or may perform data communication using a local wireless communication method among Bluetooth, infrared communication, radiofrequency (RF) communication, ZigBee communication, and/or the like.

The electronic pen 100 may include a light source 120 configured to emit infrared and visible light. The electronic pen 100 may recognize the mark 21 formed on the infrared reflection layer 10 using infrared included in natural light, a light from a fluorescent lamp, and/or the like, and may recognize the mark 21 formed on the infrared reflection layer 10 using light emitted from the electronic pen 100 itself in a dark space without enough infrared to recognize the mark 21.

In the embodiments of the present invention, '~part' represents software or a hardware component such as a field-programmable gate array (FPGA) or ASIC, and the '~part' performs some functions. However, the '~part' is not limited to the software or the hardware. The '~part' may be configured to be an addressable storage media, or to run one or more processors. Thus, the '~part', for example, includes components, such as software components, object oriented software components, class components, and task components, processors, functions, attributes, procedures, subroutines, segments of a program code, drivers, firmware, a microcode, a circuit, data, a database, data structures, tables, arrays, and variables. Functions of components and the '~part' may be combined with small numbered components and '~part' or separated from additional components and '~part'. Also, the components and the '~part' may be configured to run one or more CPUs included in a device or a security multimedia card.

The liquid crystal display device and the electronic pen system using the same according to the embodiment of the present invention can provide an information pattern which is recognizable by the electronic pen system on the liquid crystal display device generally displaying graphic information to the outside.

It is important to understand that the present invention may be embodied in many alternative forms and should not be construed as limited to the example embodiments set forth herein. While the invention is susceptible to various modifications and alternative forms, specific embodiments thereof are shown by way of example in the drawings and will herein be described in detail. It should be understood, however, that there is no intent to limit the invention to the specific forms disclosed, but on the contrary, the invention is to cover all modifications, equivalents, and alternatives falling within the spirit and scope of the invention.

What is claimed is:

1. A liquid crystal display device comprising:
   an infrared reflection layer configured to reflect infrared irradiated thereto, the infrared reflection layer including an information pattern having virtual grid lines and a plurality of marks;
   a liquid crystal layer formed on the infrared reflection layer and configured to be changed an orientation of liquid crystal molecules by an external pressure;
   an infrared light source; and
   a light guide configured to guide infrared emitted from the infrared light source toward the infrared reflection layer.

2. The liquid crystal display device of claim 1, wherein the liquid crystal layer is formed of a cholesteric liquid crystal.

3. The liquid crystal display device of claim 1, wherein the infrared reflection layer absorbs visible light and selectively reflects infrared.

4. The liquid crystal display device of claim 1, wherein the infrared reflection layer includes an infrared reflection film and an infrared diffusion film.

5. The liquid crystal display device of claim 1, wherein the mark is formed using an infrared absorption ink.

6. An electronic pen system comprising:
   a liquid crystal display device comprising:
      an infrared reflection layer configured to reflect infrared irradiated on a surface thereof, the infrared reflection layer including an information pattern having virtual grid lines and a plurality of marks;
      a liquid crystal layer formed on the infrared reflection layer and configured to be changed an orientation of liquid crystal molecules by an external pressure;
      an infrared light source; and
      a light guide configured to guide infrared emitted from the infrared light source toward the infrared reflection layer, and
   an electronic pen configured to recognize graphic information displayed on the liquid crystal display device using the information pattern.

7. The electronic pen system of claim 6, wherein the electronic pen includes an infrared detection sensor, and senses infrared reflected from the infrared reflection layer to recognize the information pattern.

8. The electronic pen system of claim 7, wherein the electronic pen further includes an infrared light source.

9. The electronic pen system of claim 6, wherein the electronic pen further includes a communication part configured to transmit the graphic information, by wires or wirelessly.

* * * * *